United States Patent [19]

Suzuki et al.

[11] Patent Number: 4,622,381
[45] Date of Patent: Nov. 11, 1986

[54] MODIFIED POLYESTER FIBER AND PROCESS FOR PREPARATION THEREOF

[75] Inventors: Togi Suzuki; Tadashi Konishi, both of Matsuyama; Kohichi Iohara, Suita; Shinji Ohwaki, Minoo; Setsuo Yamada, Ibaraki, all of Japan

[73] Assignee: Teijin Limited, Osaka, Japan

[21] Appl. No.: 783,197

[22] Filed: Oct. 2, 1985

[30] Foreign Application Priority Data

Oct. 3, 1984 [JP] Japan .................. 59-206369
Mar. 25, 1985 [JP] Japan .................. 60-58559
Apr. 17, 1985 [JP] Japan .................. 60-80273
Jun. 13, 1985 [JP] Japan .................. 60-127108

[51] Int. Cl.$^4$ .............. C08G 63/68; C08G 75/00
[52] U.S. Cl. .................. 528/295; 524/593; 525/398; 528/487; 264/103; 264/176F
[58] Field of Search ............ 528/295; 264/103, 176 F

[56] References Cited

U.S. PATENT DOCUMENTS

| | | | |
|---|---|---|---|
| 3,018,272 | 1/1962 | Griffing et al. | 528/293 |
| 4,153,660 | 5/1979 | Reese | 264/103 |
| 4,233,363 | 11/1980 | Cemel et al. | 264/103 X |
| 4,296,058 | 10/1981 | Chen | 264/103 X |
| 4,403,094 | 9/1983 | Sasaki et al. | 528/295 X |
| 4,496,716 | 1/1985 | Humbrecht et al. | 528/295 |
| 4,526,738 | 7/1985 | Miyoshi et al. | 264/176 F |
| 4,529,565 | 7/1985 | Kasatani et al. | 264/176 F X |
| 4,562,029 | 12/1985 | Black | 264/103 X |
| 4,581,399 | 4/1986 | Yoon | 264/176 F X |

FOREIGN PATENT DOCUMENTS 48-66650 9/1973 Japan .
49-38037 10/1974 Japan .
50-15274 6/1975 Japan .

*Primary Examiner*—Lucille M. Phynes
*Attorney, Agent, or Firm*—Burgess, Ryan & Wayne

[57] ABSTRACT

A fiber composed of a polyester having at least a part of terminals blocked with the residue of at least one specific metal sulfonate compound, where the amount of the blocked terminals is 1.3 to 4.0 mol % based on the dicarboxylic acid component of the polyester and the alkali dissolution speed constant is $3.3 \times 10^{-9}$ to $6.5 \times 10^{-9}$ cm/sec. This polyester has a good dyeability with a cationic dye and is excellent in the heat resistance and alkali resistance. The polyester fiber can be spun at a high speed or super high speed and can be false-twisted at a high temperature.

17 Claims, 1 Drawing Figure

MODIFIED POLYESTER FIBER AND PROCESS FOR PREPARATION THEREOF

BACKGROUND OF THE INVENTION (1) Field of the Invention

The present invention relates to a modified polyester fiber and a process for the preparation thereof. More specifically, the present invention provides a polyester fiber having a good cation dyeability and having excellent alkali resistance, heat resistance and spinnability, especially the spinnability at a high speed or ultra-high speed.

(2) Description of the Related Art

Since a polyester has various excellent properties, it is broadly used as a fiber. However, polyester is poor in dyeability and cannot effectively be dyed with a dye other than a disperse dye. Various proposals have been made to improve this poor dyeability. For example, there is known a process in which the main chain of a polyester is copolymerized with an isophthalic acid component containing a metal sulfonate group to render the polyester dyeable with a basic dye (see U.S. Pat. No. 3,018,272). According to this process, however, a large amount of diethylene glycol is formed in the polyester and the softening point is reduced to 220° to 225° C., and the polyester cannot be put into practical use.

As means for overcoming this, defect, Japanese Unexamined Patent Publication No. 48-66650, Japanese Examined Patent Publication No. 49-38037 and Japanese Examined Patent Publication No. 50-15274 propose a process in which a compound represented by the following formula:

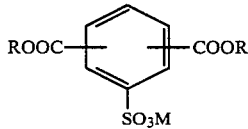

wherein R stands for a hydrogen atom, an alkyl group or the like, and M stands for an alkali metal or the like, is copolymerized as a cation-dyeable component (modifier 1) in a polyester in the presence of an inhibitor for diethylene glycol formation. Now, a fiber composed of this copolymerized polyester is used as a cation-dyeable polyester fiber. However, this process is defective in that the spinnability of the obtained polyester is poor and even if spinning is carried out at a low take-up speed of less than 2500 m/min, troubles such as yarn breaking, contamination of the cap surface (deposition of the composed materials and the like) and increase of the pack pressure frequently take place. Furthermore, obtained fiber is poor in the alkali resistance and therefore, a product obtained by mix-weaving or mix-knitting this polyester fiber with an ordinary polyester fiber cannot be subjected to alkali weight-decreasing processing. Moreover, the heat resistance is poor, and a good false-twisted yarn cannot be obtained.

With a view to improving these poor alkali resistance and heat resistance of the conventional cation-dyeable polyester fiber, we made research and as the result, it was found that if a specific compound (modifier 2) including a compound represented by the following formula:

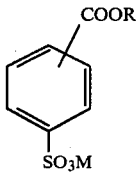

wherein R stands for a hydrogen atom, an alkyl group or the like, and M stands for an alkali metal or the like, is copolymerized instead of the modifier 1, the alkali resistance and heat resistance are greatly improved in the obtained polyester, and also the spinnability is greatly improved. However, if a fiber of this copolymerized polyester is dyed with a cationic dye, though the dye is completely absorbed, the dyeing finish is poorer than the dyeing finish attainable when the modifier 1 is copolymerized, and the brilliance is damaged and an obscure hue is obtained. Furthermore, a deep color cannot be obtained.

SUMMARY OF THE INVENTION

We made investigation on dyed polyester fibers with a view to solving the above problem. As the result, it was found that when the modifier 1 is used, the section of the dyed yarn is uniformly dyed, but when the modifier 2 is used, only the peripheral portion of the section of the dyed yarn is dyed and the central portion is not dyed (this state is called "ring dyeing"), and this difference results in the difference of the dyeing finish, even if there is no difference of the amount of the absorbed dye.

We furthered our research so as to prevent occurrence of this ring dyeing, and as the result, we found that if the amount of diethylene glycol formed in the polyester by the use of the modifier 2 is appropriately adjusted and the alkali dissolution speed constant of the polyester is adjusted within a specific range, the above-mentioned trouble of ring dyeing is eliminated, the alkali resistance and heat resistance are increased to satisfactory levels and the spinnability is improved. We have now completed the present invention based on this finding.

More specifically, in accordance with the present invention, there is provided a fiber composed of a polyester having at least a part of the terminals thereof blocked with the residue of at least one compound selected from sulfonic acid salt compounds represented by the following general formulae (I), (II) and (III):

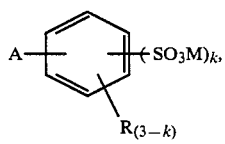

(I)

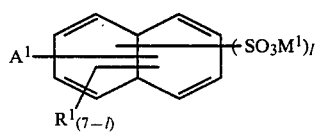

(II)

and

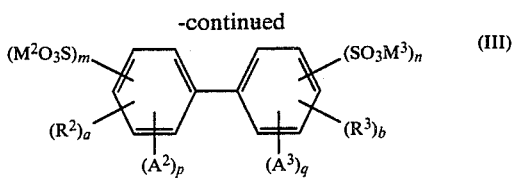

wherein A, A¹, A² and A³ stand for an esterforming functional group, R, R¹, R² and R³ stand for a hydrogen atom, a hydroxyl group, an alkyl group or a halogen atom, M, M¹, M² and M³ stand for a metal, each of k and l is 1 or 2, m and n are integers of from 0 to 2 satisfying the relation of $1 \leq m+n \leq 4$, p and q are integers of from 0 to 1 satisfying the relation of $p+q=1$, and a and b are positive integers satisfying the relations of $m+a+p=5$ and $n+b+q=5$, wherein the amount of the blocked terminals is 1.3 to 4.0 mol % based on the total acid component of the polyester and the alkali dissolution speed constant of the polyester is $3.3 \times 10^{-9}$ to $6.5 \times 10^{-9}$ cm/sec.

DESCRIPTION OF THE PREFERRED EMBODIMENTS

Figure 1:
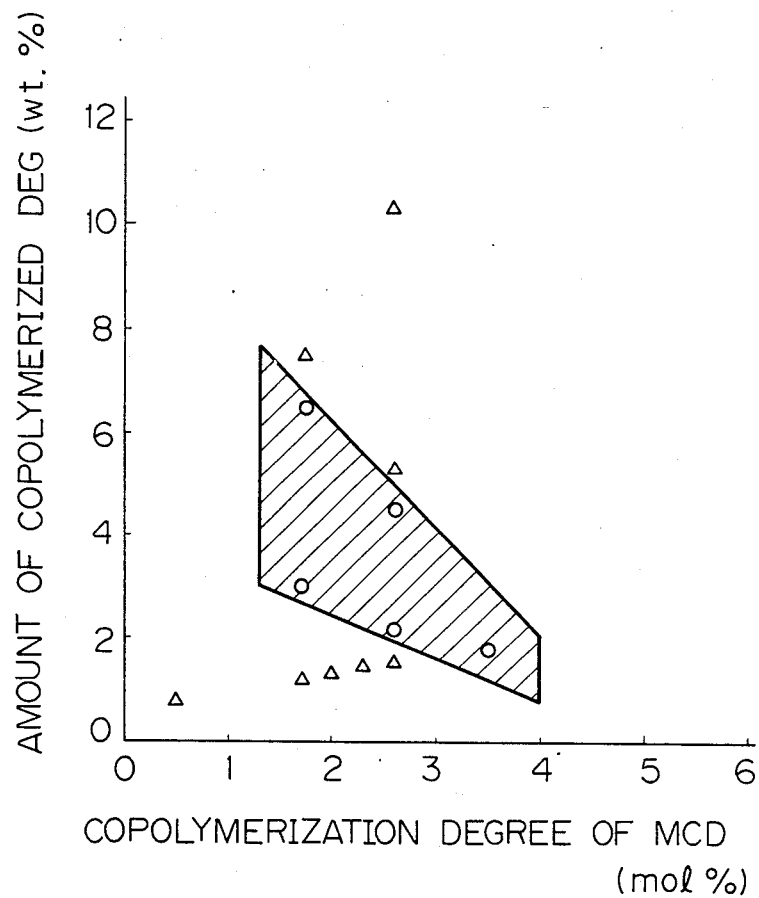
FIG. 1 is a graph illustrating an appropriate range of the relation between the copolymerization degree of the terminal-blocking sulfonic acid salt compound (MCD) and the amount of copolymerized diethylene glycol (DEG).

The polyester referred to in the present invention is mainly a polyester comprising terephthalic acid as a main acid component and at least one glycol, preferably at least one alkylene glycol selected from ethylene glycol, trimethylene glycol and tetraethylene glycol, as the main glycol.

A polyester in which a part of the terephthalic acid component is substituted by other bifunctional carboxylic acid component and/or a part of the glycol component is substituted by other glycol or diol component may be used.

As the bifunctional carboxylic acid other than terephthalic acid, there can be used aromatic, aliphatic and alicyclic bifunctional carboxylic acids such as isophthalic acid, naphthalene-dicarboxylic acid, diphenyl dicarboxylic acid, diphenoxyethane-dicarboxylic acid, β-hydroxyethoxybenzoic acid, p-hydroxybenzoic acid, adipic acid, sebacic acid and 1,4-cyclohexane-dicarboxylic acid. Furthermore, isophthalic acid having a metal sulfonate group, such as 5-sodium-sulfoisophthalic acid, may be used as a comonomer component, so far as the intended effect of the present invention can be attained. In this case, it is preferred that the amount of this comonomer component be controlled to up to 1.8 mol % based on the terephthalic acid component.

As the diol compound other than the above-mentioned glycol, there can be mentioned, for example, aliphatic, alicyclic and aromatic diol compounds such as cyclohexane-1,4-dimethanol, neopentyl glycol, bisphenol A and bisphenol S, and polyoxyalkylene glycols.

Furthermore, polycarboxylic acids such as trimellitic acid and pyromellitic acid and polyols such as glycerol, trimethylol propane and pentaerythritol may be used, so far as the polyester is substantially linear.

A polyester as mentioned above may be synthesized according to an optional process. For example, polyethylene terephthalate may be prepared according to a process described below. Ordinarily, terephthalic acid and ethylene glycol are directly subjected to esterification reaction. Alternatively, a lower alkyl ester of terephthalic acid such as dimethyl terephthalate and ethylene glycol are subjected to ester exchange reaction or terephthalic acid is reacted with ethylene oxide to form a glycol ester of terephthalic acid and/or an oligomer thereof. Then, the reaction product formed by the above-mentioned first stage reaction is heated under a reduced pressure until polycondensation is advanced to a desired degree of polymerization, whereby the second stage reaction is accomplished and polyethylene terephthalate is obtained.

In the present invention, it is indispensable that at least a part of the terminals of the polymer chain of the above-mentioned polyester should be blocked with at least one member selected from compounds represented by the above-mentioned general formulae (I), (II) and (III). In the formulae (I), (II) and (III), A, A¹, A² and A³ stand for an ester-forming group. As specific examples, there can be mentioned compounds of the following formulae:

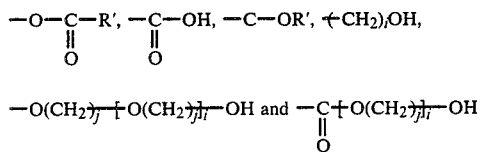

wherein R' stands for a lower alkyl group or a phenyl group, i is an integer of at least 1, and j is an integer of at least 2.

A, A¹, A² and A³ may be the same or different. R, R¹, R² and R³ stand for a hydrogen atom, a hydroxyl group, an alkyl group or a halogen atom. The alkyl group may be linear or branched. It is preferred that the number of carbon atoms in the alkyl group be 1 to 30, especially 1 to 4. Cl and Br are preferred as the halogen atom. It is especially preferred that R, R¹, R² and R³ should stand for a hydrogen atom or an alkyl group. R, R¹, R² and R³ may be intramolecularly or intermolecularly the same or different. M, M¹, M² and M³ stand for a metal, and an alkali metal is preferred. M, M¹, M² and M³ may be intramolecularly or intermolecularly the same or different.

As preferred examples of the compound of the general formula (I), there can be mentioned m-sodium-sulfobenzoic acid (methyl, β-hydroxyethyl and δ-hydroxybutyl esters thereof), p-sodium-sulfobenzoic acid (methyl, β-hydroxyethyl and δ-hydroxybutyl esters thereof), o-sodium-sulfobenzoic acid (methyl, β-hydroxyethyl and δ-hydroxybutyl esters thereof), 5-sodium-sulfo-m-toluic acid (methyl, β-hydroxyethyl and δ-hydroxybutyl esters thereof), 5-sodium-sulfo-o-toluic acid (methyl, β-hydroxyethyl and δ-hydroxybutyl esters thereof), 5-sodium-sulfosalicylic acid (methyl, β-hydroxyethyl and δ-hydroxybutyl esters thereof), 5-lithium-sulfosalicylic acid (methyl, β-hydroxyethyl and δ-hydroxybutyl esters thereof), sodium o-(β-hydroxyethyl)benzene-sulfonate, and 3-chloro-5-sodium-sulfobenzoic acid (methyl, β-hydroxyethyl and δ-hydroxybutyl esters thereof).

As preferred examples of the compound of the general formula (II), there can be mentioned 6-sodium-sulfo-1-naphthoic acid (methyl, β-hydroxyethyl and δ- hydroxybutyl esters thereof), 5-sodium-sulfo-1-naphthoic acid (methyl, β-hydroxyethyl and δ-hydroxybutyl esters thereof), 6-sodium-sulfo-2-naphthoic acid (methyl, β-hydroxyethyl and δ-hydroxybutyl esters thereof), 7-sodium-sulfo-2-naphthoic acid (methyl, β-hydroxyethyl and δ-hydroxybutyl esters thereof), 6-lithium-sulfo-1-naphthoic acid (methyl, β-hydroxyethyl and δ-hydroxybutyl esters thereof) and 6-potassium-sulfo-1-naphthoic acid (methyl, β-hydroxyethyl and δ-hydroxybutyl esters thereof).

As preferred examples of the compound of the general formula (III), there can be mentioned 3-sodium-sulfodiphenyl-4'-carboxylic carboxylic acid (methyl, β-hydroxyethyl and δ-hydroxybutyl esters thereof), 4-sodium-sulfodiphenyl-4'-carboxylic acid (methyl, β-hydroxyethyl and δ-hydroxybutyl esters thereof), 4-sodium-sulfodiphenyl-2'-carboxylic acid (methyl, β-hydroxyethyl and δ-hydroxybutyl esters thereof), 3-sodium-sulfodiphenyl-2'-carboxylic acid (methyl, β-hydroxyethyl and δ-hydroxybutyl esters thereof) and 4-sodium-sulfodiphenyl-4'-(β-hydroxyethyl).

Blocking of the terminals of the polyester chain with the above-mentioned compound can be accomplished by adding the compound at an optional stage before completion of the synthesis of the polyester, preferably before completion of the reaction of the first stage. If the amount added of the cmopound is too small, since dye absorption sites in the polyester fiber are insufficient, the dyeability with a basic dye becomes insufficient. If the amount added of the compound is too large, the polymerization degree of the polyester is not increased beyond a low level during the polycondensation and physical properties, such as the strength, of the polyester fiber are degraded. Accordingly, the compound is added in an amount of 1.3 to 4.0 mol %, preferably 1.5 to 3.5 mol %, especially preferably 2.2 to 3.3 mol %, based on the bifunctional carboxylic acid component constituting the polyester. It is preferred that at least 50% of all the terminals of the polyester chain be blocked with the modifier compound.

By the alkali dissolution speed constant referred to in the present invention is meant the alkali dissolution speed constant determined when a round solid fiber, obtained by performing melt-spinning at a low spinning speed of about 1000 m/min and then conducting the drawing and heat treatment, is heat-treated at 180° C. for 45 seconds and boiled at 100° C. in an aqueous solution containing 5 g/l of sodium hydroxide. The alkali dissolution speed constant is defined by the following formula:

$$\sqrt{R} = -1.68 \times 10^4 k \sqrt{\frac{\rho}{De}} \cdot t + 10$$

wherein R stands for the insoluble solid content (% by weight) after the passage of t seconds, t stands for the treatment time (seconds), k stands for the alkali dissolution speed constant (cm/sec), De stands for the fineness (denier) or the single filament of the fiber, and ρ stands for the density of the single filament.

In the present invention, the alkali dissolution speed constant is determined according to the following procedures.

The polymer is dried according to a customary method and is spun at a spinning speed of 1100 m/min at 285° C. through a spinneret having 24 circular spinning holes having a diameter of 0.3 mm, and the spun fiber is drawn and heat-treated at a drawing speed of 1200 m/min by a heating roller maintained at 84° C. and a plate heater maintained at 180° C. at such a draw ratio that the elongation of the resulting drawn yarn is 30%, whereby a 75-denier/24-filament yarn is obtained. The obtained drawn yarn is formed into a knitted fabric, and the knitted fabric is scoured according to a customary method, pre-set at 180° C. for 45 seconds and treated with an aqueous solution containing 5 g/l of sodium hydroxide at the boiling temperature for 4 hours. The weight decrease ratio (the soluble weight content) is determined and the alkali dissolution speed constant k is calculated by using this value of the soluble weight content.

In the present invention, the alkali dissolution speed constant is $3.3 \times 10^{-9}$ to $6.5 \times 10^{-9}$ cm/sec, preferably $3.5 \times 10^{-9}$ to $6.5 \times 10^{-9}$ cm/sec. If the alkali dissolution speed constant is smaller than $3.3 \times 10^{-9}$ cm/sec, the dyeability with a cationic dye becomes insufficient and the above-mentioned ring dyeing is readily caused. If the value k is at least $3.3 \times 10^{-9}$ cm/sec, to our great surprise, the high speed spinnability is markedly improved. The reason has not been completely elucidated, but it is believed that by introducing the metal sulfonate groups in the terminals of the polyester chain, an effect of preventing orientation and crystallization is highly improved and by introducing an appropriate amount of DEG into the polyester main chain, the above effect is synergistically enhanced.

If the value k is larger than $6.5 \times 10^{-9}$ cm/sec, the dyeability with a cationic dye is not further improved but the alkali resistance is degraded. Namely, if the value k is too large, the mobility of the molecule chain is increased and an appropriate affinity between the metal sulfonate groups present at the ends of the molecule chain is broken, and relaxation of the molecular orientation is readily caused and the molecular orientation is not increased during the high-speed spinning.

In the present invention, this alkali dissolution speed constant has a direct relation to the amount of ethylene glycol formed as a by-product during the polymerization and inevitably copolymerized in the main chain of the polyester. Furthermore, when dimethyl isophthalate, polyethylene glycol, trimellitic acid or the like is copolymerized as the third component, the alkali dissolution speed constant varies according to the amount of the copolymerized third component as well as the amount of diethylene glycol. For example, in the case where diethylene glycol is copolymerized, from the experiments made by us, it has been found that in order to obtain an alkali dissolution speed constant included within the above-mentioned range, the relation between the copolymerization degree of the terminal-blocking metal sulfonate compound (MCD) and the amount of copolymerized diethylene glycol.(DEG) be within the range shown in FIG. 1.

This relation is expressed by the following formula:

$$\frac{5.0}{1.2} - \frac{[MCD]}{1.2} \leq [DEG] \leq \frac{12.5}{1.2} = \frac{2.5[MCD]}{1.2}$$

wherein [MCD] stands for the copolymerization degree of the terminal-biocking metal sulfonate compound (mol % based on the bifunctional carboxylic acid constituting the polyester), which is 1.3 to 4.0 mol %, and [DEG] stands for the amount or copolymerized diethylene glycol (% by weight based on the polyester).

The method for forming a fiber from the so-obtained modified polyester dyeable with a basic dye is not particularly critical, and a customary melt-spinning process for the production of a polyester fiber can be optionally adopted. The fiber may be a solid fiber having no hollow portion or a hollow fiber having a hollow portion. The cross-section of the spun fiber may be a circular section or a non-circular section. The polymer in the molten state is extruded through a spinneret. There may be adopted a continuous spinning process in which the polymerization step is directly connected to the spinning step, a process in which a polymer once chipped or peletized at the polymerization step is molten again and extruded at the spinning step, and other optional processes. Generally speaking of the modified polyethylene terephthalate for example, the polymer is molten at a temperature of 265° to 320° C. The extruded filamentary yarn is passed through known customary operations such as heating below the spinneret, application of cooling air and application of an oiling agent, and the yarn is passed through an ordinary goddet roller (the speed of the goddet roller corresponds to the take-up speed) and wound on a winder. In a special case, there may be adopted a so-called goddetless spinning process in which the above-mentioned goddet roller is not used. Namely, the winder is arranged just below the spinneret and the extruded yarn is linearly taken up and wound on the winder. In this case, the winding speed of the winder corresponds to the take-up speed.

In accordance with the present invention, there also is provided a process for the preparation of a polyester fiber, which comprises the above-mentioned step of melt-spinning the polyester. In this process, it is preferred that the spinning take-up speed be increased to at least 3000 m/min, especially at least 5000 m/min.

It is preferred that the intrinsic viscosity $[\eta]c$ of the polyester chips be from 0.38 to 0.55. If $[\eta]c$ exceeds 0.55, the spinnability at the high-speed spinning is bad and yarn breaking is readily caused. The reason is that since the molecular weight of the polyester is too high, entanglement of molecule chains is readily caused, and during the high-speed spinning and fiber structure-manifesting steps, there is no time sufficient to release this entanglement in ultra-fine denier filaments and the spinning tension is readily concentrated.

In contrast, if $[\eta]c$ is smaller than 0.38, the spinnability at the high-speed spinning is worsened and yarn breaking is readily caused. The reason is that since the molecular weight of the polyester is too low, the orientation of the molecule chain is readily relaxed in the melt-extruded filaments and increase of the molecule chain becomes difficult, and the number of so-called tying molecules connecting crystals manifested in the filaments to one another is small. Accordingly, the physical properties of the obtained fiber are poor.

On the other hand, if $[\eta]c$ is in the range of from 0.38 to 0.55, very good spinnability can be expected at the high-speed spinning and ultra-high-speed spinning. In case of an ordinary polyester, if the intrinsic viscosity is within this range, the molecular weight is too low and filament breaking resembling filament falling is caused at the ultra-high-speed spinning. However, in the present invention, by combination of this requirement of tne intrinsic viscosity with the other requirement of the above-mentioned modification of the terminals of the molecule chain, the spinnability is unexpectedly highly improved.

In most of conventional polyesters dyeable with basic dyes, a bifunctional modifier such as 5-sodiumsulfoisophthalate is copolymerized in the interior of the molecule chain. In this case, since a weak affinity of the modifier per se acts between the molecule chains, that is, so-called physical crosslinking acts between the molecule chains, the spinnability at the high-speed spinning is drastically reduced, and spinning at a speed exceeding 5000 m/min is ordinarily impossible. Furthermore, the physical characteristics, such as the strength, of the fiber are at very low levels. In this connectin, the polyester fiber of the present invention is advantageous because the fiber is dyeable with a basic dye and the physical characteristics are greatly improved.

The polyester fiber taken up at a speed of at least 5000 m/min according to the present invention has a tenacity of more than 3 g/d. The polyester fiber of the present invention has such a structure that the birefringence $\Delta n$ of the entire filaments is 0.10 to 0.13 and the crystallization degree $Xx$ is at least 30%. If $\Delta n$ is smaller than 0.10 or $Xx$ is lower than 30%, the structural stability of the fiber is poor and the fiber cannot be used at all. In order to obtain in exceeding 0.13, the spinning tension should be abnormally increased by excessively increasing the air resistance at the high-speed spinning, and in this case, filament breaking is often caused and the spinnability at the high-speed spinning is drastically reduced.

In the polyester fiber of the present invention, it is preferred that the birefringence $\Delta na$ of the amorphous portion be 0.04 to 0.08. If $\Delta na$ is less than 0.04, the physical characteristics of the fiber are poor and the high-speed spinnability is degraded, and when a woven or knitted fabric of this fiber is subjected to the weight-decreasing treatment with an alkali, the weight-decreasing speed is too high and is hardly controlled. On the other hand, if $\Delta na$ exceeds 0.08, any drawing action should be imposed on the fiber at the high-speed spinning step and the high-speed spinnability is ordinarily degraded.

The polyester fiber taken up at a speed of 3000 to 5000 m/min according to the present invention has a tenacity of at least 3.2 g/d and a biregrinence $\Delta n$ of at least 0.10 if the filament denier is less than 0.8. Incidentally, a conventional basic dye-dyeable polyester fiber has ordinarily a tenacity of about 2.5 to about 3.2 g/d and a polyester fiber prepared by high-speed spinning has a tenacity of about 1.5 to about 2.5 g/d. Incidentally, known spinning conditions for fine-denier filaments can be adopted for high-speed spinning of such a fine-denier filament as described above in the present invention. However, in order to prevent increase of the air resistance, it is preferred that the running distance of the yarn between the spinneret and the take-up roller be as small as possible or multi-filaments be gathered as upstream as possible by a pneumatic nozzle or the like.

In accordance with the present invention, there is further provide a process for the preparation of a polyester textured yarn, which comprises false-twisting the above-mentioned polyester fiber of the present invention. According to this process, the above-mentioned polyester fiber is false-twisted at a false twist number T (t/m) represented by the following formula:

$$\frac{20{,}000}{\sqrt{De}} \leq T \leq \frac{36{,}000}{\sqrt{De}}$$

wherein De stands for the denier of the filament yarn at the time when it passes through a false-twisting member, and at a false-twisting temperature H (°C.) of 180°≦H≦230° C. preferably 180°≦H≦220° C. The false-twisting temperature means a heater temperature.

The starting yarn to be subjected to the false-twisting processing may be a drawn yarn which has passed through the melt-spinning and drawing steps or a partially oriented yarn (POY) which has been wound at a spinning speed of about 3000 m/min. If this partially oriented yarn is used, drawing and false-twisting can be simultaneously performed and the manufacturing cost can be advantageously reduced. Furthermore, in case of the cation-dyeable fiber of the present invention, the draw ratio can be increased to a level much higher than the draw ratio adoptable for POY of a conventional polymer copolymerized with a sodium-sulfoisophthalic acid component, when the comparison is made based on the same winding speed. The present invention is advantageous also in this point.

The so-obtained starting yarn is subjected to false-twisting or draw-false-twisting. The obtained starting yarn is subjected to false-twisting at a flast twist number T(t/m) of $$\frac{20,000}{\sqrt{De}} \leq T \leq \frac{36,000}{\sqrt{De}}$$

in which De stands for the denier of the filament at the time when it passes through a false-twisting member. If the false twist number T(t/m) is smaller than $$\frac{20,000}{\sqrt{De}},$$

the obtained textured yarn is poor in the precent crimp and bulkiness and the nerve of a knitted or woven fabric formed from this yarn is insufficient. If the false twist number T(t/m) is larger than $$\frac{36,000}{\sqrt{De}},$$

fluffs are formed at the false-twisting step, and the tenacity of the textured yarn is reduced and the textured yarn cannot be put into practical use.

If the false-twisting temperature is lower than 80° C., the crimpability of the textured yarn is low, and if the false-twisting yarn is higher than 230° C., reduction of the tenacity is extreme, fusion bonding among filaments becomes vigorous, fluffing is readily caused and uneven dyeing is often caused. Accordingly, the textured yarn cannot be put into practical use.

In the present invention, by dint of the abovementioned characterrstics, the following effects can be attained.

(1) The modified polyester fiber of the present invention is dyeable with a basic dye and is excellent in the alkali resistance. Accordingly, an ordianry alkali weight-decreasing treatment for improving the touch and feel of a woven or knitted fabric can be applied to the modified polyester fiber of the present invention.

(2) Since the speed of the alkali weight-decreasing treatment adopted for the modified polyester fiber of the present invention is close to that adopted for regular polyester fiber, if a woven or knitted fabric obtained by mix-weaving or mix-knitting the cation-dyeable polyester fiber of the present invention with a regular polyester fiber is subjected to the alkali weight-decreasing treatment, there can be obtained a woven or knitted fabric which has a silk-like soft and good touch and in which high-grade dyeing effects such as a different-color dyeing effect and a pepper-and-salt dyeing effect are manifested.

(3) Since the modified polyester fiber of the present invention has a good resistance to high temperature, reduction of the tenacity or shrinking is not caused even if dyeing is carried out, for example, at 130° C., and a good touch or feel can be easily manifested.

(4) In the present invention, since the amount of by-products formed during the polymerization is small, increase of the pack pressure at the spinning step is small and reduction of the properties is small (in the case where sodium sulfoisophthalate is copolymerized, oligomeric by-products which contain a larger portion of sodium sulfoisophthalate component is inevitably formed).

(5) The modified polyester fiber of the present invention is excellent in spinnability, and spinning is possible at a very high spinning speed of at least 3000 m/min, especially at least 5000 m/min.

(6) Since the modified polyester fiber of the present invention is excellent in the heat resistance, a trouble such as reduction of the tenacity or fusion bonding is not caused at the false-twisting treatment conducted at a high temperature, and an excellent textured yarn can be obtained.

Incidentally, in the present invention, the terminal groups are determined according to the following methods.

(Sulfonate Group)

The amount of the sulfonate group-containing compound bonded to the terminals of the polymer chain can be known by determining sulfur (fluometric X-ray analysis) and sodium (atomic-absorption spectroscopy) contained in the polyester. In the case where dimethyl 5-sodium-sulfoisophthalate is used as one comonomer component, if the sample polyester is hydrolyzed, for example, by potassium hydroxide/ethanol and a water extract from the formed precipitate layer is made acidic with hydrochloric acid and extracted with methanol, the sulfonate group-containing compound is extracted with methanol, and therefore, by subjecting the extract to NMR analysis, the ratio between the sulfonate group-containing compound copolymerized in the polymer chain and the sulfonate group-containing compound blocking the terminals can be determined and both can be separately determined.

By the term "total terminals" used in the present invention is meant the sum of hydroxy, carboxyl and hydrocarbon groups forming ordinary terminals of a polyester and the above-mentioned sulfonate group-containing compound terminals. If other terminal-blocking agent is intentionally used, the terminals of this agent are included in the total terminals.

The ratio S(%) of the terminals blocked with the sulfonate group-containing compound to the total terminals is determined according to the following equation:

$$S = \frac{\text{number of terminals of sulfonate group-containing compound}}{\text{number of hydroxyl groups + number of carboxyl groups + number of hydrocarbon terminal groups + number of terminals of sulfonate group-containing compound}} \times 100$$

The numbers of hydroxyl groups, carboxyl groups and methyl terminal groups in the above equation can be determined according to the following methods.

(Hydroxyl Group)

The OH terminal group in the polyester is converted to a benzoyl group by using benzoyl chloride and esterification is then carried out with ethanol. Formed ethyl benzoate is determined by gas chromatography, and the OH terminal group is determined from the obtained result.

(Carboxyl Group)

The polyester sample is heated and dissolved in benzyl alcohol and the carboxyl group is determined by titration with a solution of sodium hydroxide.

(Methyl Terminal Group)

The polyester sample is heated and decomposed by hydrazine hydrate, and the supernatant is subjected to gas chromatography to determine the methyl terminal group.

The intrinsic viscosity $[\eta]$ is given by the following formula:

$$\lim_{c \to 0} \frac{\ln(\eta rel)}{c}$$

and is a value obtained by the following measurement at a temperature of 35° C.

Namely, $\eta rel$ is the ratio of the viscosity of a dilute polyester solution in o-chlorophenol as a solvent to the viscosity of the solvent measured at the same temperature and unit, and c indicates the grams of the polyester in 100 cc of the mixed solution.

The amount of copolymerized diethylene glycol is determined by pyrolytically decomposing a polyester sample with hydrazine hydrate, and subjecting the supernatant liquid to gas chromatography to determine the amount of the decomposed diethylene glycol.

In the present invention, the birefringence $\Delta n$ represents the difference between refractive indexes parallel to and rectangular to the fiber axis, determined by using a Berek compensator attached to a polarization microscope. Furthermore, the crystallization degree Xx is determined by the known wide angle X-ray diffraction method. The birefringence $\Delta na$ of the amorphous portion is calculated according to the following formula:

$$\Delta n = 0.212 fc Xd + \Delta na(1-Xd)$$

wherein Xd stands for the crystallization degree determined by the known density measurement method.

The crystal orientation parameter fc in the above formula is determined from the average orientation angle $\theta$ determined by the wide X-ray diffraction method according to the following equation:

$$fc = \frac{180 - \theta}{180}$$

wherein $\theta$ is determined from half widths of (010) and (100) diffraction arcs.

The present invention will now be described in detail with reference to the following examples. All of "parts" in the examples are by weight.

EXAMPLE 1

An ester-exchange vessel was charged with 100 parts of dimethyl terephthalate (DMT), 66 parts of ethylene glycol, 0.03 part of manganese acetate tetrahydrate (0.024 mol % based on dimethyl terephthalate) and sodium acetate trihydrate as an agent for controlling formation of diethylene glycol in an amount shown in Table 1, and the temperature was elevated from 140° C. to 230° C. over a period of 4 hours in a nitrogen atmosphere. Thus, esterexchange reaction was conducted while removing formed methanol from the reaction system by distillation. Then, 0.03 part of a 56% aqueous solution of orthophosphoric acid (0.033 mol % based on dimethyl terephthalate) was added to the obtained product and the mixture was stirred for 5 minutes, and m-sodium-sulfobenzoic acid was added in an amount shown in Table 1 in the form of an ethylene glycol solution having a concentration of 20% by weight. The mixture was stirred for 10 minutes and 0.04 part of antimony trioxide (0.027 mol % based on dimethyl terephthalate) was added, and the mixture was transferred into a polymerization vessel and the pressure was reduced from 760 mmHg to 1 mmHg over a period of 1 hour. Simultaneously, the temperature was elevated from 230° C. to 280° C. over a period of 1 hour and 30 minutes. Polymerization was carried out under a reduced pressure lower than 1 mmHg at a polymerization temperature of 280° C. until the intrinsic viscosity shown in Table 1 was obtained. The amount of diethylene glycol in the obtained polymer, the intrinsic viscosity (IV) and the softening point (SP) of the polymer are shown in Table 1.

The obtained polymer was dried according to a customary method and was spun at a spinning speed of 1100 m/min at a temperature of 285° C. by using a spinneret having 24 circular spinning holes having a hole diameter of 0.3 mm. The spun fiber was subjected to the draw-heat treatment at a drawing speed of 1200 m/min by a heating roller maintained at 84° C. and a plate heater maintained at 180° C. at such a darw ratio that the elongation of the final drawn yarn was 30%, whereby a 75-denier/24-filament drawn yarn was obtained.

The obtained drawn yarn was formed into a knitted fabric and the knitted fabric was scoured and pre-set at 180° C. for 45 seconds according to customary procedures. Then, the knitted fabric was treated for 4 hours with an aqueous solution containing 5 g/l of sodium hydroxide at the boiling point to determine the soluble weight content. The value k calculated from this soluble weight content is shown in Table 1.

Separately, the knitted fabric before the alkali treatment was dyed at 120° C. for 60 minutes in a dyeing solution containing 2% owf of a 1/1 mixture of Cathilon Blue CD-FRLH and Cathilon Blue CD-FBLH (supplied by Hodogaya Kagaku), 3 g/l of Glauber salt and 0.3 g/l of acetic acid, and soaping was carried out according to customary procedures to obtain a blue fabric. The state of the single yarn section after dyeing is shown in Table 1.

m-sodium-sulfobenzoic acid. The obtained results are shown in Table 2.

TABLE 1

| Run No. | MCD (mol % based on DMT) | | Agent for Controlling Formation of DEG (mol % based on DMT) | | DEG (% by weight based on polymer) | Softening Point (°C.) | IV | $k \times 10^9$ (cm/sec) | Single Yarn Section After Dyeing* |
|---|---|---|---|---|---|---|---|---|---|
| 1 | m-sodium-sulfo-benzoic acid | 2.6 | sodium acetate trihydrate | 80 | 2.2 | 257 | 0.423 | 3.55 | uniformly dyed to interior |
| 2 | m-sodium-sulfo-benzoic acid | 2.6 | sodium acetate trihydrate | 30 | 4.5 | 246 | 0.421 | 6.25 | " |
| 3 | m-sodium-sulfo-benzoic acid | 2.6 | sodium acetate trihydrate | 0 | 10.3 | 225 | 0.422 | 12.50 | " |
| 4 | m-sodium-sulfo-benzoic acid | 2.6 | sodium acetate trihydrate | 27 | 5.6 | 240 | 0.424 | 7.00 | " |
| 5 | m-sodium-sulfo-benzoic acid | 2.6 | sodium acetate trihydrate | 160 | 1.4 | 259 | 0.422 | 3.15 | ring dyeing (dyed to about 3μ from periphery) |
| 6 | m-sodium-sulfo-benzoic acid | 3.5 | sodium acetate trihydrate | 160 | 1.8 | 258 | 0.350 | 5.02 | uniformly dyed to interior |
| 7 | m-sodium-sulfo-benzoic acid | 2.3 | sodium acetate trihydrate | 160 | 1.4 | 260 | 0.424 | 2.40 | ring dyeing (dyed to about 2.5μ from periphery) |
| 8 | m-sodium-sulfo-benzoic acid | 2.0 | sodium acetate trihydrate | 160 | 1.3 | 262 | 0.437 | 1.94 | ring dyeing (dyed to about 2μ from periphery) |
| 9 | m-sodium-sulfo-benzoic acid | 1.7 | sodium acetate trihydrate | 5 | 7.5 | 232 | 0.457 | 6.91 | uniformly dyed to interior |
| 10 | m-sodium-sulfo-benzoic acid | 1.7 | sodium acetate trihydrate | 10 | 6.5 | 236 | 0.458 | 6.32 | " |
| 11 | m-sodium-sulfo-benzoic acid | 1.7 | sodium acetate trihydrate | 40 | 3.0 | 253 | 0.460 | 3.52 | " |
| 12 | m-sodium-sulfo-benzoic acid | 1.7 | sodium acetate trihydrate | 160 | 1.2 | 262 | 0.459 | 1.69 | ring dyeing (dyed to about 2μ from periphery) |
| 13 | m-sodium-sulfo-benzoic acid | 0.5 | sodium acetate trihydrate | 160 | 0.76 | 263 | 0.588 | 1.17 | ring dyeing (dyed to about 2μ from periphery) |

Note
*diameter of dyed single yarn was 18μ
**runs Nos. 3–5, 7–9, 12 and 13 were comparative runs

TABLE 2

| Run No. | MCD (mol % based on DMF) | DEG (% by weight based on polymer) | Softening point (°C.) | IV | $k \times 10^9$ (cm/sec) | Alkali Weight Decreasing Treatment | | Yarn Tenacity Reduction Ratio (%) | Remarks* |
|---|---|---|---|---|---|---|---|---|---|
| | | | | | | Treatment Time (minutes) | Weight Decrease Ratio (%) | | |
| 1 | m-sodium-sulfobenzoic acid 2.6 | 2.2 | 257 | 0.423 | 3.55 | 85 | 20 | 24.3 | C$_{10}$(80) |
| 3 | m-sodium-sulfobenzoic acid 2.6 | 10.3 | 225 | 0.422 | 12.50 | 24 | 20 | 75.0 | C$_{10}$(0) |
| 6 | m-sodium-sulfobenzoic acid 3.5 | 1.8 | 258 | 0.350 | 5.02 | 60 | 20 | 30.1 | C$_{10}$(160) |
| 9 | m-sodium-sulfobenzoic acid 1.7 | 7.5 | 232 | 0.457 | 6.91 | 43 | 20 | 55.3 | C$_{10}$(5) |
| 11 | m-sodium-sulfobenzoic acid 1.7 | 3.0 | 253 | 0.460 | 3.52 | 86 | 20 | 22.8 | C$_{10}$(40) |
| 14 | 5-Na—sulfoisophthalic acid 2.6 | 1.45 | 257 | 0.485 | 7.01 | 40 | 20 | 60.4 | C$_{10}$(160) |

Note
*C$_{10}$ indicates sodium acetate trihydrate and parenthesized value indicates the amount (millimole % based on DMT)
**runs Nos. 3, 9 and 14 are comparative runs By using drawn yarns prepared in runs Nos. 1, 3, 6, 9 and 11 of Example 1, plain weave fabrics having a weave density of 27 warps/cm and 25 wefts/cm were formed, and the fabrics were scoured and pre-set according to customary procedures. Each fabric was treated in a 1.5% aqueous solution of sodium hydroxide at the boiling temperature to obtain a fabric having a weight decrease ratio of 20%.

The time of the alkali weight decreasing treatment required for obtaining a weight decrease ratio of 20% and the ratio of reduction of the yarn tenacity are shown in Table 2.

The yarn tenacity reduction ratio was determined by comparing the tenacity of multifilaments obtained by disintegrating the fabric which had been dyed after the alkali treatment, with the tenacity of multifilaments obtained by disintegrating the fabric before the alkali treatment.

For comparison, the experiments were carried out by using 2.6 mol % of 5-sodium-sulfoisophthalic acid and 160 millimol % of sodium acetate trihydrate instead of

EXAMPLE 2

An ester-exchange vessel was charged with 100 parts of dimethyl terephthalate (DMT), 66 parts of ethylene glycol, a sulfonate compound in an amount shown in Table 3, 0.03 part of manganese acetate tetrahydrate (0.024 mol % based on dimethyl terephthalate) and sodium acetate trihydrate as an agent for controlling formation of diethylene glycol in an amount shown in Table 3, and the temperatuere was elevated from 140° C. to 230° C. over a period of 4 hours in a nitrogen atmosphere. Thus, esterexchange reaction was conducted while removing formed methanol from the reaction system by distillation. Then, 0.03 part of a 56% aqueous solution of orthophosphoric acid (0.033 mol % based on dimethyl terephthalate) and 0.04 part of antimony trioxide (0.027 mol % based on dimethyl terephthalate) were added, and the mixture was transferred into a polymerization vessel and the pressure was reduced from 760 mmHg to 1 mmHg over a period of 1 hour. Simultaneously, the temperature was elevated from 230° C. to 280° C. over a period of 1 hour and 30 minutes. Polymerization was carried out under a reduced pressure lower than 1 mmHg at a polymerization temperature of 280° C. until the intrinsic viscosity shown in Table 3 was obtained. The amount of diethylene glycol in the obtained polymer, and the alkali dissolution speed constant (k), intrinsic viscosity (IV) and softening point (SP) of the polymer are shown in Table 3.

of the spinneret to the point 12 cm below the spinneret, and the region of from the point 15 cm below the spinneret to the point 90 cm below the spinneret was cooled by feeding air maintained at room temperature laterally at a speed of about 15 cm/sec.

The intrinsic viscosity and spinnability of the polymer and the physical properties of the obtained fiber are shown in Table 4.

TABLE 4

| Run No. | Polymer of Run No. in Example 1 | Amount of MCD (mol %) | Amount of DEG by weight % | High speed spinnability** | Tenacity (g/d) | Elongation (%) | $\Delta n$ | Xx (%) | $\Delta n_a$ |
|---|---|---|---|---|---|---|---|---|---|
| 1 | Run No. 1 | 2.6 | 2.2 | ⊚ | 4.3 | 27 | 0.120 | 34 | 0.060 |
| 2 | Run No. 2 | 2.6 | 4.5 | ⊚ | 4.3 | 28 | 0.122 | 32 | 0.061 |
| 3 | Run No. 6 | 3.5 | 1.8 | ⊚ | 3.2 | 20 | 0.123 | 29 | 0.064 |
| 4 | Run No. 10 | 1.7 | 6.5 | ⊚ | 4.2 | 27 | 0.118 | 33 | 0.053 |
| 5 | Run No. 11 | 1.7 | 3.0 | ⊚ | 4.1 | 27 | 0.119 | 34 | 0.052 |
| 6 | Regular polymer | 0 | 0.66 | x | 3.9 | 24 | 0.119 | 35 | 0.031 |

Note:
*Run No. 6 is a comparison run.
**Evaluation of the spinnability was based on the following standard.
x: Yarn breakage occurred in several tens seconds after the starting of spinning.
△: Yarn breakage occurred in 1 to 2 minutes after the starting of spinning.
○: Yarn breakage occurred in 5 to 6 minutes after the starting of spinning.
⊚: Yarn breakage occurred in 10 to 20 minutes after the starting of spinning.
⊚: No yarn breakage occurred over 20 minutes after the starting of spinning.

The obtained polymer was then subjected to spinning and drawing as in Example 1. The dyeability and yarn tenacity reduction ratio due to alkali treatment of the obtained yarn are also shown in Table 3.

EXAMPLE 4

The polymer obtained in run No. 1 of Example 1 and the regular polyester obtained in the comparison run of

TABLE 3

| | | Sulfonate compound | | Properties of polymer | | | | Alkali weight decreasing treatment | | | Yarn tenacity |
|---|---|---|---|---|---|---|---|---|---|---|---|
| Run No. | Kind | Amount (mol % based on DMT) | Amount of $C_{10}$ (m mol % based on DMT) | $K \times 10^9$ (cm/sec) | Amount of DEG (% by weight based on polymer) | Intrinsic viscosity | Softening point | Treatment time (minutes) | Weight decrease ratio (%) | Dyeability with basic dye | reduction ratio (%) |
| 1 | methyl 5-Na—sulfo-m-toluate | 2.6 | 60 | 4.75 | 3.2 | 0.431 | 251.8 | 64 | 20 | Uniformly dyed to interior | 25.3 |
| 2 | methyl m-Na—sulfo-benzoate | 2.6 | 50 | 5.01 | 3.5 | 0.428 | 250.4 | 60 | 20 | Uniformly dyed to interior | 25.7 |
| 3 | (δ-hydroxybutyl)m-Na—sulfobenzoate | 2.6 | 80 | 3.83 | 2.3 | 0.421 | 256.0 | 79 | 20 | Uniformly dyed to interior | 23.1 |
| 4 | methyl 6-Na—sulfo-naphthalene-2-carboxylate | 2.6 | 80 | 3.90 | 2.4 | 0.415 | 255.6 | 77 | 20 | Uniformly dyed to interior | 21.7 |
| 5 | methyl 4-Na—sulfodiphenyl-4'-carboxylate | 2.6 | 80 | 4.04 | 2.5 | 0.418 | 255.1 | 75 | 20 | Uniformly dyed to interior | 21.8 |

EXAMPLE 3

The polymers obtained in run Nos. 1, 2, 6, 10 and 11 of Example 1 as well as a regular polyester prepared by the same procedure as in Example 1, except that no m-sodium-sulfo-benzoic acid or sodium acetate was used, were each dried at 160° C. for 4 hours according to a customary method and melt-extruded at a maximum temperature of 310° C. by using a spinneret having 12 circular spinning holes having a hole diameter of 0.35 mm, and the spun fiber was wound on a winder through a pair of goddet rollers. Namely, the spun fiber was taken up at a high take-up speed of 8,000 m/min, adjusted by the goddet roll with which the fiber first fell in contact, whereby a 37.5-denier/12-fimalent multifilament yarn was obtained. Heating was effected so that the temperature of the atmosphere surrounding the running yarn was 180° C. in the region of from the point Example 3 were each subjected to a high speed spinning as in Example 3 at a take-up speed of 5,000 to 8,800 m/min. The properties of the obtained fibers are shown in Table 5.

The polymer according to the present invention had excellent high speed spinnability, while the regular polyester had poor high speed spinnability. It is apparent from Table 5 that the tenacity of the fiber from the regular polyester becomes lower as the take-up speed becomes higher. Also, the $\Delta n$ and Xx become lower. Contrary to this, in the case of the polymer according to the present invention, no appreciable reduction in the tenacity and in the $\Delta n$ and Xx occurs even at the high take-up speed. Further, the polymer according to the invention has an amorphous region birefringence $\Delta n_a$ higher than that of the regular polyester, which supports the excellent high speed spinnability of the polymer according to the invention.

TABLE 5

| Run No. | Polymer | Take-up speed (m/min) | Tenacity (g/d) | Elongation (%) | Δn | Xx (%) | Δn$_a$ | High speed spinnability |
| --- | --- | --- | --- | --- | --- | --- | --- | --- |
| 1 | Regular Polyester | 5000 | 3.6 | 67 | 0.097 | 33 | 0.059 | ○ |
| 2 | Regular Polyester | 6000 | 4.2 | 50 | 0.114 | 35 | 0.058 | Δ |
| 3 | Regular Polyester | 7000 | 4.3 | 37 | 0.121 | 36 | 0.037 | X |
| 4 | Regular Polyester | 8800 | 3.4 | 20 | 0.105 | 30 | 0.029 | X |
| 5 | Polymer in Run No. 1 of Example 1 | 5000 | 3.3 | 69 | 0.090 | 22 | 0.068 | ◎ |
| 6 | Polymer in Run No. 1 of Example 1 | 6000 | 3.7 | 49 | 0.111 | 33 | 0.075 | ◎ |
| 7 | Polymer in Run No. 1 of Example 1 | 7000 | 4.1 | 37 | 0.117 | 33 | 0.066 | ◎ |
| 8 | Polymer in Run No. 1 of Example 1 | 8800 | 4.4 | 24 | 0.120 | 34 | 0.055 | ◎ |

EXAMPLE 5

The polymers obtained in run Nos. 4 and 5 of Example 2 and in run No. 14 (comparison run) of Example 1 were each melt-extruded at a miximum temperature of 310° C. using a spinneret having 72 circular spinning holes having a hole diameter of 0.20 mm and the spun fiber was taken up at a speed of 4,000 m/min. to obtain a 36-denier/72-filament multifilament yarn (monofilament denier of 0.5 denier). The distance from the spinneret to the first take-up roller (godet roller) was 3 m.

The spinnability of the polymers and the properties of the obtained fibers are shown in Table 6.

TABLE 6

| Run No. | Polymer | High speed spinnability | Tenacity (g/d) | Δn |
| --- | --- | --- | --- | --- |
| 1 | Run No. 4 of Example 2 | ◎ | 3.7 | 0.119 |
| 2 | Run No. 5 of Example 2 | ◎ | 3.8 | 0.121 |
| 3 | Run No. 14 of Example 1 | X | 1.8 | 0.065 |

EXAMPLE 6

Each of the polymers obtained in run Nos. 1, 2, 6, 10 and 11 of Example 1 and in run No. 14 (comparison run) of Example 1 was dried according to a customary method, and was spun using a spinneret having 24 circular spinning holes having a hole diameter of 0.25 mm, the dried polymer was molted at 300° C., taken up at a take-up speed of 1500 m/min and drawn according to a customary method to obtain a 75-denier/24-filament multifilament yarn.

By using a false-twisting machine, each yarn was false-twisted at a false twist number of 3380 t/m at a temperature shown in Table 5 while adjusting the tension on the inlet side of a false-twisting member to about 20 g.

The obtained results are shown in Table 7.

TABLE 7

| Run No. | Polymer | False-twisting temperature (°C.) | Tenacity (g/d) | Crimpage (%) |
| --- | --- | --- | --- | --- |
| 1 | Run No. 1 of Example 1 | 180 | 2.1 | 19.3 |
| 2 | Run No. 2 of Example 1 | 180 | 2.0 | 18.5 |
| 3 | Run No. 6 of Example 1 | 190 | 2.0 | 23.0 |
| 4 | Run No. 10 of Example 1 | 180 | 2.1 | 20.4 |
| 5 | Run No. 11 of Example 1 | 185 | 2.2 | 22.2 |
| 6 | Run No. 14 of Example 1 | 185 | 1.9 | 10.3 |

We claim:

1. A fiber composed of a polyester having at least a part of the terminals thereof blocked with the residue of at least one compound selected from sulfonic acid salt compounds represented by the following general formulae (I), (II) and (III):

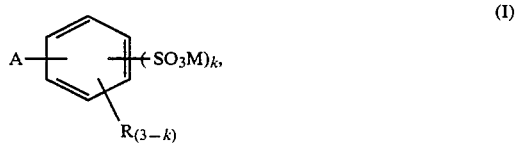
(I)

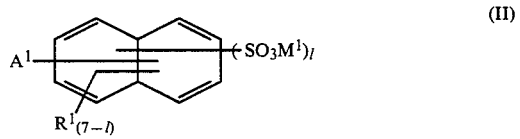
(II)

and

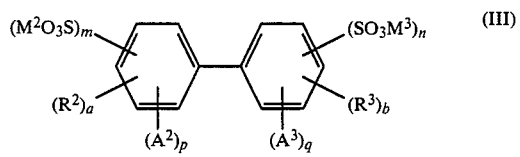
(III)

wherein A, A$^1$, A$^2$ and A$^3$ stand for an esterforming functional group, R, R$^1$, R$^2$ and R, R$^1$, R$^2$ and R$^3$ stand for a hydrogen atom, a hydroxyl group, an alkyl group or a halogen atom, M, M$^1$, M$^2$ and M$^3$ stand for a metal, each of k and l is 1 or 2, m and n are integers of from 0 to 2 satisfying the relation of $1 \leq m+n \leq 4$, p and q are integers of from 0 to 1 satisfying the relation of $p+q=1$, and a and b are positive integers satisfying the relations of $m+a+p=5$ and $n+b+q=5$, wherein the amount of the blocked terminals is 1.3 to 4.0 mol % based on the total acid component of the polyester and the alkali dissolution speed constant is $3.3\times 10^{-9}$ to $6.5\times 10^{-9}$ cm/sec.

2. A fiber as set forth in claim 1, wherein the amount of the blocked terminals is 1.5 to 3.5 mol % based on the total acid component of the polyester.

3. A fiber as set forth in claim 2, wherein the amount of the blocked terminals is 2.2 to 3.3 mol % based on the total acid component of the polyester.

4. A fiber as set forth in claim 1, wherein the alkali dissolution speed constant is $3.5\times 10^{-9}$ to $6.5\times 10^{-9}$ cm/sec.

5. A fiber as set forth in claim 1, wherein the blocked terminals occupy at least 50% of the total terminals.

6. A fiber as set forth in claim 1, wherein the polyester contains diethylene glycol as a comonomer component.

7. A fiber as set forth in claim 6, wherein the amount of copolymerized diethylene glycol satisfies a requirement represented by the following formula:

$$\frac{5.0}{1.2} - \frac{[MCD]}{1.2} \leq [DEG] \leq \frac{12.5}{1.2} - \frac{2.5[MCD]}{1.2}$$

wherein [MCD] stands for the copolymerization degree of the terminal-blocking metal sulfonate compound (mol % based on the bifunctional carboxylic acid constituting the polyester), which is 1.3 to 4.0 mol %, and [DEG] stands for the amount of copolymerized diethylene glycol (% by weight based on the polyester).

8. A fiber as set forth in claim 1, wherein A A$^1$, A$^2$ and A$^3$, which may be the same or different, stand for an ester-forming functional group represented by the following formula:

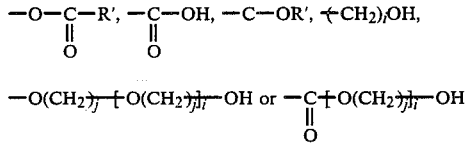

wherein R' stands for a lower alkyl group or a phenyl group, i is an integer of at least 1, and j is an integer of at least 2.

9. A fiber as set forth in claim 1, wherein R, R$^1$, R$^2$ and R$^3$, which may be the same or different, stand for a hydrogen atom or an alkyl group.

10. A fiber as set forth in claim 1, wherein M, M$^1$, M$^2$ and M$^3$, which may be the same or different, stand for an alkali metal.

11. A fiber as set forth in claim 1, wherein the compound represented by the formula (I) is at least one member selected from the group consisting of m-sodium-sulfobenzoic acid (methyl, β-hydroxyethyl and δ-hydroxybutyl esters thereof), p-sodium-sulfobenzoic acid (methyl, β-hydroxyethyl and δ-hydroxybutyl esters thereof), o-sodiun-sulfobenzoic acid (methyl, β-hydroxyethyl and δ-hydroxybutyl esters thereof), 5-sodiumsulfo-m-toluic acid (methyl, β-hydroxyethyl and δ-hydroxybutyl esters thereof), 5-sodium-sulfo-o-toluic acid (methyl, β-hydroxyethyl and δ-hydroxybutyl esters thereof), 5-sodium-sulfosalicylic acid (methyl, β-hydroxyethyl and δ-hydroxybutyl esters thereof), 5-lithium-sulfosalicylic acid (methyl, β-hydroxyethyl and δ-hydroxybutyl esters thereof), sodium o-(β-hydroxyethyl)benzene-sulfonate, and 3-chloro-5-sodium-sulfobenzoic acid (methyl, β-hydroxyethyl and δ-hydroxybutyl esters thereof).

12. A fiber as set forth in claim 1, wherein the compound represented by the formula (II) is at least one member selected from the group consisting of 6-sodiumsulfo-1-naphthoic acid (methyl, β-hydroxyethyl and δ-hydroxybutyl esters thereof), 5-sodium-sulfo-1-naphthoic acid (methyl, β-hydroxyethyl and δ-hydroxybutyl esters thereof), 6-sodium-sulfo-2-naphthoic acid (methyl, β-hydroxyethyl and δ-hydroxybutyl esters thereof), 7-sodium-sulfo-2-naphthoic acid (methyl, β-hydroxyethyl and δ-hydroxybutyl esters thereof), 6-lithium-sulfo-1-naphthoic acid (methyl, β-hydroxyethyl and δ-hydroxybutyl esters thereof) and 6-potassium-sulfo-1-naphthoic acid (methyl, β-hydroxyethyl and δ-hydroxybutyl esters thereof).

13. A fiber as set forth in claim 1, wherein the compound represented by the formula (III) is at least one member selected from the group consisting of 3-sodium-sulfodiphenyl-4'-carboxylic acid (methyl, β-hydroxyethyl and δ-hydroxybutyl esters thereof), 4-sodium-sulfodiphenyl-4'-carboxylic acid (methyl, β-hydroxyethyl and δ-hydroxybutyl esters thereof), 4-sodium-sulfodiphenyl-2'-carboxylic acid (methyl, β-hydroxyethyl and δ-hydroxybutyl esters thereof), 3-sodium-sulfodiphenyl-2'-carboxylic acid (methyl, β-hydroxyethyl and δ-hydroxybutyl esters thereof) and 4-sodium-sulfodiphenyl-4'-(β-hydroxyethyl).

14. A process for the preparation of a polyester fiber, which comprises melt-spinning a polyester having at least a part of the terminals thereof blocked with the residue of at least one compound selected from sulfonic acid salt compounds represented by the following general formulae (I), (II) and (III):

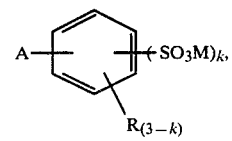

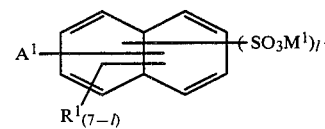

and

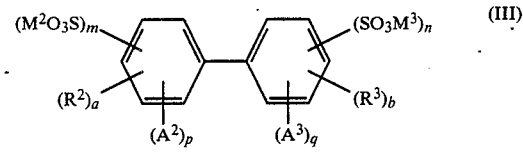

wherein A, A$^1$, A$^2$ and A$^3$ stand for an esterforming functional group, R, R$^1$, R$^2$ and R$^3$ stand for a hydrogen atom, a hydroxyl group, an alkyl group or a halogen atom, M, M$^1$, M$^2$ and M$^3$ stand for a metal, each of k and l is 1 or 2, m and n are integers of from 0 to 2 satisfying the relation of $1 \leq m+n \leq 4$, p and q are integers of from 0 to 1 satisfying the relation of $p+q=1$, and a and b are positive integers satisfying the relations of $m+a+p=5$ and $n+b+q=5$, wherein the amount of the blocked terminals is 1.3 to 4.0 mol % based on the total acid component of the polyester and the alkali dissolution speed constant is $3.3 \times 10^{-9}$ to $6.5 \times 10^{-9}$ cm/sec.

15. A process according to claim 14, wherein the take-up speed is at least 3000 m/min.

16. A process according to claim 15, wherein the take-up speed is at least 5000 m/min.

17. A process for the preparation of a textured polyester yarn, which comprises false-twisting a polyester fiber at a false twist number T (t/m) represented by the following formula:

$$\frac{20{,}000}{\sqrt{De}} \leq T \leq \frac{36{,}000}{\sqrt{De}}$$

wherein De stands for the denier of the filament yarn at the time when it passes through a false-twisting member, and at a false-twisting temperature H (°C.) of $180° \leq H \leq 230°$ C., said polyester fiber being composed of a polyester having at least a part of the terminals thereof blocked with the residue of at least one compound selected from sulfonic acid salt compounds represented by the following general formulae (I), (II) and (III):

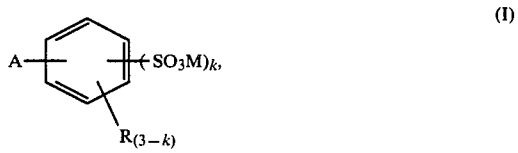

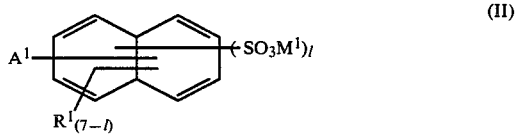

and

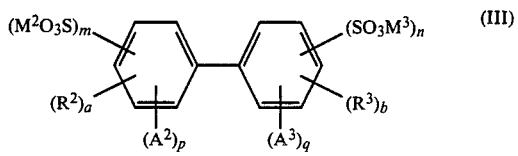

wherein A, $A^1$, $A^2$ and $A^3$ stand for esterforming functional group, R, $R^1$, $R^2$ and $R^3$ stand for a hydrogen atom, a hydroxyl group, an alkyl group or a halogen atom, M, $M^1$, $M^2$ and $M^3$ stand for a metal, each of k and l is 1 or 2, m and n are integers of from 0 to 2 satisfying the relation of $1 \leq m+n \leq 4$, p and q are integers of from 0 to 1 satisfying the relation of $p+q=1$, and a and b are positive integers satisfying the relations of $m+a+p=5$ and $n+b+q=5$, wherein the amount of the blocked terminals is 1.3 to 4.0 mol % based on the total acid component of the polyester and the alkali dissolution speed constant is $3.3 \times 10^{-9}$ to $6.5 \times 10^{-9}$ cm/sec.

* * * * *